United States Patent [19]

Hedvall et al.

[11] 3,927,570
[45] Dec. 23, 1975

[54] MEANS FOR MEASURING THE TEMPERATURE IN ELECTRICAL MACHINES

[75] Inventors: Per Hedvall, Vasteras; Wolfgang Lampe; Erich Spicar, both of Ludvika, all of Sweden

[73] Assignee: Allmanna Svenska Elektriska Aktiebolaget, Vasteras, Sweden

[22] Filed: Feb. 8, 1974

[21] Appl. No.: 440,871

[30] Foreign Application Priority Data
Mar. 1, 1973  Sweden.............................. 7302868

[52] U.S. Cl.................. 73/350; 73/359; 317/14 F; 317/14 J
[51] Int. Cl.² ...................... G01K 1/14; G01K 7/08
[58] Field of Search..................... 73/350, 359, 342; 317/14 F, 14 H, 14 J

[56] References Cited
UNITED STATES PATENTS

| | | |
|---|---|---|
| 964,961 | 7/1910 | Fisher ............................ 73/359 X |
| 1,269,546 | 6/1918 | Montsinger ......................... 73/350 |
| 2,612,779 | 10/1952 | Mulford ............................... 73/359 |
| 3,491,597 | 1/1970 | Engelhardt ....................... 73/342 X |
| 3,559,486 | 2/1971 | Gormar ................................ 73/359 |
| 3,849,705 | 11/1974 | McElroy ......................... 317/14 F X |

Primary Examiner—Richard C. Queisser
Assistant Examiner—Frederick Shoon

[57] ABSTRACT

A winding for an electrical machine enclosed in a casing is provided with an arrangement for measuring the temperature which includes a thermocouple having its hot junction attached to the conductor of the winding at the point where the temperature is to be measured. The conductors of the thermocouple are attached to the winding conductor and to the lead-in conductor and follow the lead-in conductor outside of the casing to a point where a definable temperature prevails, at which point the cold junction of the thermocouple is located.

2 Claims, 4 Drawing Figures

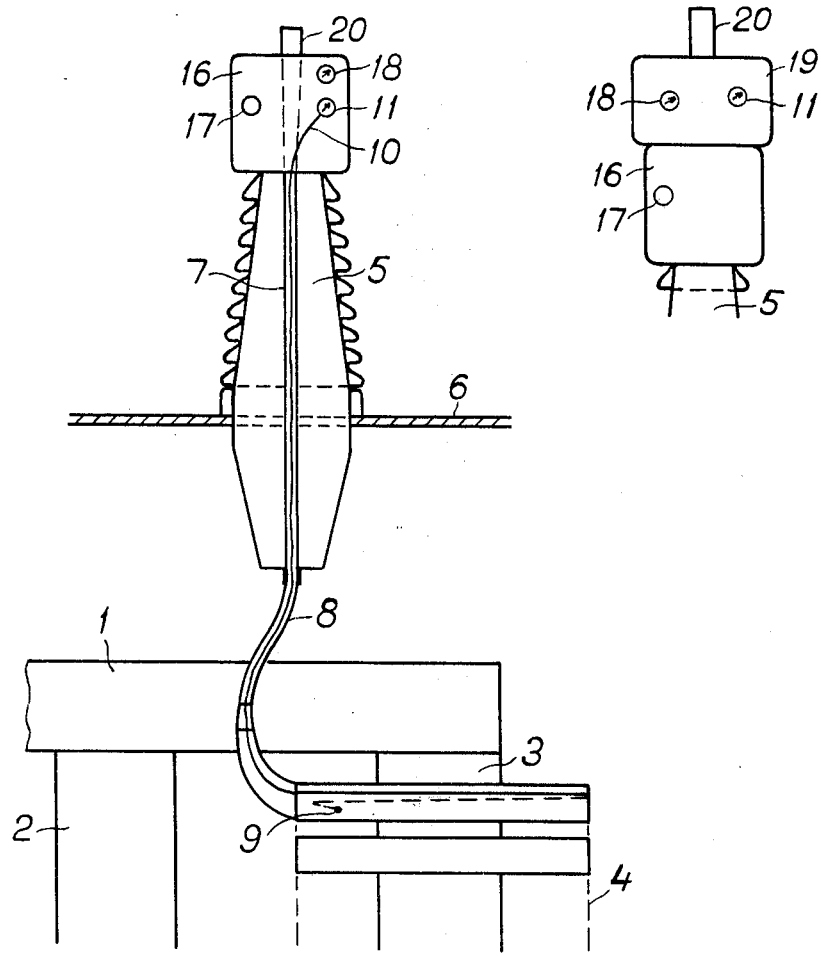
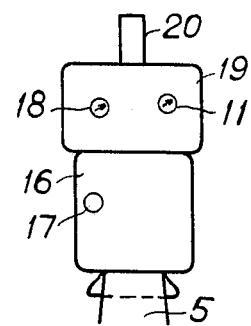
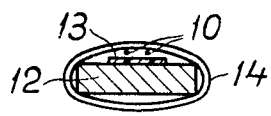
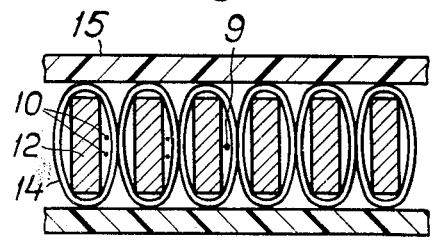

MEANS FOR MEASURING THE TEMPERATURE IN ELECTRICAL MACHINES

BACKGROUND OF THE INVENTION

1. Field of the Invention

The invention relates to an arrangement for measuring the temperature in electrical machines.

2. The Prior Art

In order for a transformer to reach the expected life, it must be assured that the temperature in the oil and in the windings does not exceed certain values, which are laid down by rules. It is therefore necessary to be able to measure and also to supervise continuously, on the one hand, the highest oil temperature which may occur and, on the other hand, the highest temperature in the windings, the so-called hot-spot temperature.

The top oil temperature is the temperature of the oil at the upper end of the winding when it leaves the winding. The difficulties in measuring this temperature are not great and measuring devices for this purpose have been proposed. The hot-spot temperature, on the other hand, is more difficult to measure and supervise since it normally occurs inside the winding. In disc-wound coils, for example, it normally occurs in any of the central turns of the uppermost disc. The reason for the occurrence of the hot-spot temperature there is, not only that the uppermost discs have the least satisfactory cooling, because the temperature of the oil is highest here, but also that any radial leakage fields which may occur result in additional losses, above all in the upper discs and maximum losses in the uppermost disc. The reason that the temperature rise is higher in the central turns is that these have the least satisfactory cooling because of their position in the disc.

The demands which are put on devices for measuring the hot-spot temperature are that the measuring can be carried out without interference from the electric and magnetic fields, and also that the measuring devices should not disturb said fields. Furthermore, the measuring device must not influence or be influenced by shock tests or other tests, for example investigations about partial dischargings. The measuring error should not exceed ±2°C and temperatures up to 180°C should be capable of being measured, preferably with immediate response. The proper measuring body should occupy a very small space and be passive.

SUMMARY OF THE INVENTION

The present invention fulfills these requirements and relates to a means for measuring the temperature in windings of electrical machines, such as transformers, rotary machines, and the like with the help of thermocouples.

Because the conductors from the thermocouple out of the machine are very thin and flexible, they may follow the current conductor from the winding out of the machine without noticeably encroaching upon the space. Because of the small dimensions of the said conductors, their location with respect to the current conductor of the machine and the extremely low power transmitted through them, the influence of the measuring device on the electric and magnetic fields as well as the influence of the said fields on the measuring will be negligible.

BRIEF DESCRIPTION OF THE DRAWINGS

In the accompanying drawing,

FIG. 1 shows a side view of a part of a transformer core, the upper part of a winding and a bushing with measuring instruments on the top of it.

FIG. 1a shows an alternative positioning of the measuring element.

FIG. 2 shows a cross-section through a winding conductor with the thermocouple leads and insulation between said leads and the conductor.

FIG. 3 shows a radially directed vertical cross-section through a winding disc at the point where the hot junction is situated.

DESCRIPTION OF THE PREFERRED EMBODIMENTS

FIG. 1 shows a part of an iron core in a transformer having an upper yoke 1 and two core legs 2 and 3. The right-hand leg 3 supports a disc-wound coil 4 of which only the two upper discs 41 and 42 are shown. A bushing 5 is mounted in the cover 6 of the transformer. The central conductor 7 of the bushing is connected to the uppermost disc in the winding by means of a flexible connecting conductor 8. The thermocouple used as a measuring member has its hot junction 9 placed in the uppermost disc, which is assumed in this case to have the highest temperature. FIG. 1 shows how the lead 10 of the thermocouple, for the sake of simplicity shown as one single conductor, goes from the measuring point 9 in the uppermost disc and thereafter follows the connecting conductor 8 and the central conductor 7 of the bushing to the top of the bushing, where it is connected to a temperature indicating instrument 11. Alternatively the junction 9 may be located in the next to the uppermost disc if it can be assumed that this has the highest temperature. If the central conductor 7 of the bushing consists of a tube, the connection lead 8 is led in a field-free area through the bushing.

The instrument 11 may be placed, as shown in FIG. 1, inside the bushing top cover 16, which also contains other instruments such as oil level indicator 17, oil temperature indicator, and the like, in a known manner. The instruments are positioned inside windows in the cover and therefore they do not interfere with the electric field. The reading of the instruments may be performed in conventional manner, for example with the help of binoculars.

Also the cold junction is placed in the top cover. Since the deflection of the measuring instrument 11 is proportional to the difference between the temperatures of the hot and cold junctions, the temperature of the cold junction must be known. For this purpose the top cover also comprises a thermometer 18 indicating the temperature of the cold junction. The measuring device could also be provided with a device, known per se, which automatically compensates for the deflection of the instrument 11 in response to alterations in the temperature of the cold joint.

According to another alternative, the instrument 11, the thermometer 18, the cold junction of the thermocouple and, whenever applicable, the above-mentioned compensating device can be placed in a separate cover 19 which is positioned above the top cover 16, as shown in FIG. 1a. The central conductor 7 of the bushing then passes both through the top cover 16 and the cover 19, and the outer terminal 20 of the bushing is situated above the cover 19.

FIG. 2 shows on a larger scale a cross-section through a conductor 12 in the pile-wound coil. The conductor 12 has the two leads 10 of the thermocouple arranged on its side with a slightly semiconducting insulation 13 between the conductor 12 and the leads 10. The conductor insulation 14 surrounds all these parts, the leads 10 being fixed with respect to the conductor 12. The slightly semiconducting insulation is applied to ensure a better strength when a shock strain occurs. As an alternative a strong capacitive connection can be arranged in order to secure a compensation of strains due to shock.

According to a further alternative the conductor 12 of the winding is used as one part of the thermocouple. In that case only one conductor to the thermocouple is used and this is soldered onto the conductor at the measuring point 9', which will then be the hot junction.

The length of the winding conductor which contains the thermocouple, whether it is fixed to the surface below the insulation or placed in a cut-out or hollow conductor, is prepared in advance. When manufacturing the winding, the prepared conductor piece is hard-soldered in order to form the uppermost part of the winding.

FIG. 3 shows a cross-section of the winding disc containing the measuring point. The disc comprises six turns and the measuring point 9 is positioned in the middle of the disc and the conductors 10 accompany the conductor 12 into the measuring point. Above and below the disc there are insulating pieces 15 forming spacers against the adjacent discs.

With a device according to the invention it is possible to supervise continuously the hot-spot temperature operation, either by means of continuous recording or by arranging equipment which emits a signal when the temperature is too high. It provides a possibility of long-term supervision and determination of the remaining life of the transformers by putting together time and temperature. Supervision of overload can be arranged and also indication of thermal overload.

We claim:

1. In an electric machine having a casing (6), a winding (4) inside the casing, and an outer terminal (20) outside the casing, means for measuring the temperature of said winding comprising a thermocouple having a hot junction (9), a cold junction and two thermocouple conductors (10) connecting said two junctions, at least one bushing (5) arranged on said casing, supporting said outer terminal, a connection lead (8) passing through said bushing and connecting the winding and the outer terminal, said hot junction being the measuring point of the thermocouple and being positioned on the winding conductor at a point where the temperature is to be measured, said cold junction being located adjacent the top of the bushing, said thermocouple conductors (10) following said winding conductor and connection lead (8) through the bushing to the cold junction, a temperature measuring instrument (11) connected to the thermocouple and positioned on the top of the bushing to said cold junction, said thermocouple having two thermocouple conductors, one of said conductors being constituted by said connection lead (8), the second of said thermocouple conductors (10) being soldered to the winding conductor at the hot junction (9).

2. In a winding according to claim 1, a slightly semiconducting insulation (13) between the winding conductor (12) and the conductors of the thermocouple.

* * * * *